(12) United States Patent
Zhu et al.

(10) Patent No.: US 7,817,748 B2
(45) Date of Patent: Oct. 19, 2010

(54) PRAGMATIC ADAPTIVE MAXIMUM RATIO COMBINING (MRC) AND MINIMUM MEAN SQUARE ERROR (MMSE) MULTIPLE INPUT MULTIPLE OUTPUT-ORTHOGONAL FREQUENCY DIVISION MULTIPLEXING (MIMO-OFDM) RECEIVER ALGORITHM

(75) Inventors: Jing Zhu, Hillsboro, OR (US); Qiang Li, Hillsboro, OR (US); Qinghua Li, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 640 days.

(21) Appl. No.: 11/761,389

(22) Filed: Jun. 12, 2007

(65) Prior Publication Data
US 2008/0310486 A1    Dec. 18, 2008

(51) Int. Cl.
*H03K 9/00* (2006.01)
(52) U.S. Cl. ...................................... 375/316
(58) Field of Classification Search .................. 375/316
See application file for complete search history.

(56) References Cited

U.S. PATENT DOCUMENTS

| | | | |
|---|---|---|---|
| 2001/0050967 A1* | 12/2001 | Kuzminskiy et al. | 375/350 |
| 2003/0048800 A1* | 3/2003 | Kilfoyle et al. | 370/441 |
| 2006/0133549 A1* | 6/2006 | Talwar | 375/346 |
| 2006/0140297 A1 | 6/2006 | Maltsev et al. | |
| 2006/0285585 A1* | 12/2006 | Sampath | 375/227 |
| 2007/0058709 A1* | 3/2007 | Chen et al. | 375/231 |

OTHER PUBLICATIONS

Gacanin, "Generalized OFDM for bridging between OFDM and single-carrier transmission," The Ninth International Conference on Communications Systems, 2004, ICCS 2004, Sep. 7-7, 2004 pp. 145-149.*

Iraji, "Interference cancellation for space-time block-coded MC-CDMA systems over multipath fading channels," 2003 IEEE 58th Vehicular Technology Conference, 2003,VTC 2003-Fall, vol. 2, Oct. 6-9, 2003 pp. 1104-1108 vol. 2.*

Heiskala ("OFDM Wireless LANs: A Theoretical and Practical Guide", Sams Publishing 2002, this book is clearly in possession of the Applicants see IDs filed on Oct. 8, 2007 pp. 1-5, 12, 13, 37, 48-55, 66 and 123-140.*

Zhu, "Adaptive CSMA for Scalable Network Capacity in High-Density WLAN: A Hardware Prototyping Approach,"This paper appears in: INFOCOM 2006. 25th IEEE International Conference on Computer Communications. Proceedings Publication Date: Apr. 2006.*

(Continued)

*Primary Examiner*—Juan A Torres
(74) *Attorney, Agent, or Firm*—Carrie A. Boone, P.C.

(57) ABSTRACT

An adaptive receiver algorithm is disclosed, for use in multiple-input-multiple-output orthogonal frequency division multiplexing systems. The adaptive receiver algorithm selectively chooses either the maximum ratio combining technique or the minimum mean square error technique, for optimum receiver performance, depending on the characteristics of the wireless environment.

14 Claims, 6 Drawing Sheets

OTHER PUBLICATIONS

J. Zhu, B. Metzler, Xingang Guo and York Liu, "Adaptive CSMA for Scalable Network Capacity in High-Density WLAN: A Hardware Prototyping approach", INFOCOM'06, Apr. 2006.

J. Winters, "Optimum Combining in Digital Mobile Radio with Co-channel Interference", IEEE Journal on Selected Area in Communications. vol. sac-2 52, No. 4, Jul. 1984.

T. A. Thomas and F. W. Vook, "Asynchronous Interference Suppression in Broadband Cyclic-Prefix Communications", WCNC'03, Mar. 20, 2003.

A. Maltsev, A. Khoryaev, R. Maslennikov, "Co-channel Interference Cancellation for OFDM Systems" Intel document, Apr. 2004.

John Terry and Juha Heiskala, "OFDM Wireless LANs: A Theoretical and Practical Guide", pp. 50-55, Sams Publishing 2002.

\* cited by examiner

PRAGMATIC ADAPTIVE MAXIMUM RATIO COMBINING (MRC) AND MINIMUM MEAN SQUARE ERROR (MMSE) MULTIPLE INPUT MULTIPLE OUTPUT-ORTHOGONAL FREQUENCY DIVISION MULTIPLEXING (MIMO-OFDM) RECEIVER ALGORITHM

TECHNICAL FIELD

This application relates to wireless transmissions under 802.11, and, more particularly, to receiver algorithms associated with wireless transmission.

BACKGROUND

The Institute of Electrical and Electronics Engineers (IEEE) has adopted a set of standards for wireless local area networks (LANs), known as 802.11. Wireless products satisfying 802.11a, 802.11b, 802.11g, and 802.11n are currently on the market.

A new generation of mobile and handheld devices has emerged under 802.11n, supporting multiple wireless interfaces or radios. A single mobile device, for example, may have three or four radios, each one supporting a different wireless network, such as wireless wide-area network, or WWAN (cellular), wireless local-area network, or WLAN (802.11a/b/g/n), wireless personal-area network, or WPAN (Bluetooth, UWB, Zigbee), and wireless metropolitan-area network, or WMAN (802.16). The flexibility built into such devices is intended to maximize wireless connectivity and user experiences.

A single basic service set (BSS) of a wireless local area network (LAN) may include an access point (AP) and a number of different stations (STA). The BSS may also be referred to as a cell. The WLAN may include a second BSS, a third, and so on. Entities in each BSS may communicate at any of a number of rates (known as the basic rate set). The entities of the BSS (the APs and STAs) communicate by sending frames to one another, whether through an AP or point-to-point between STAs.

Figure 2:
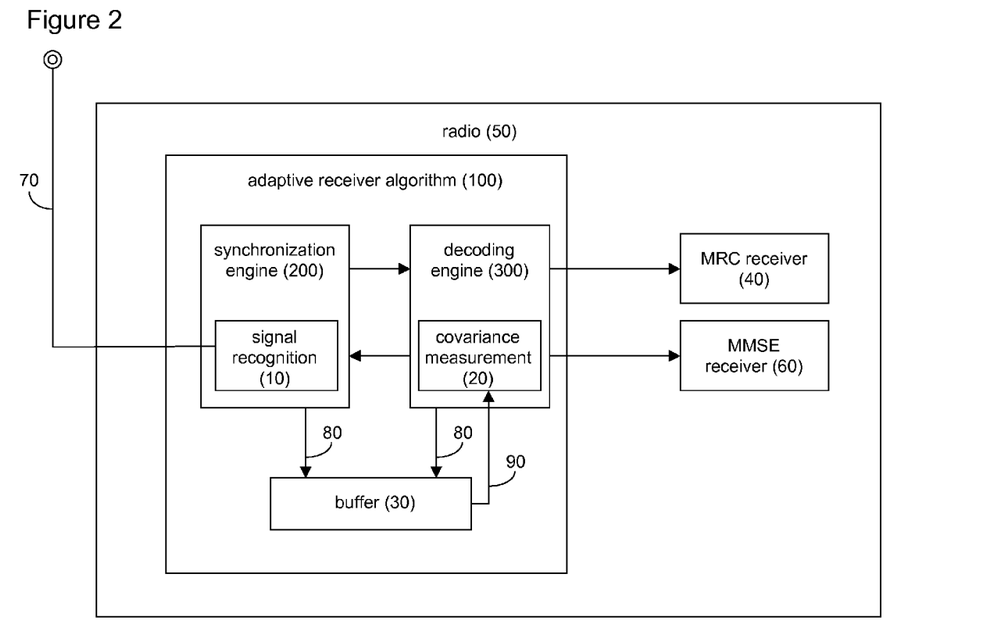
FIG. 2 is a block diagram of an adaptive receiver algorithm, according to some embodiments.
Figure 5:
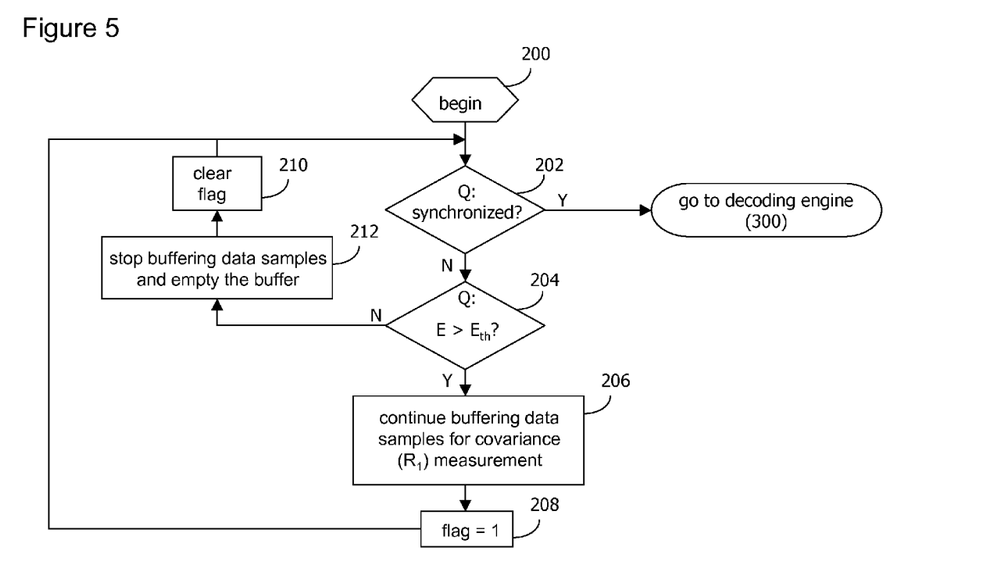
FIG. 5 is a flow diagram of the synchronization engine of the adaptive receiver algorithm of FIG. 2, according to some embodiments.
Figure 6:
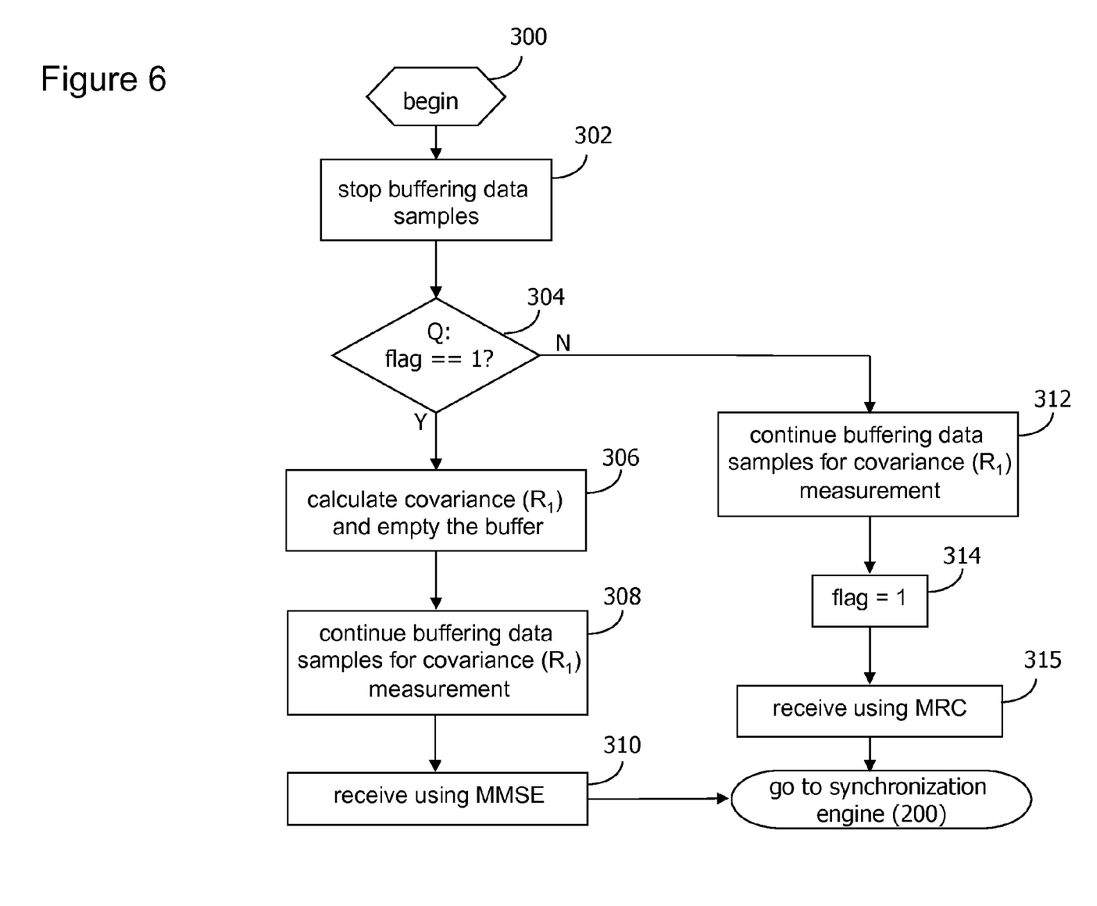
FIG. 6 is a flow diagram of the decoding engine of the adaptive receiver algorithm of FIG. 2, according to some embodiments.

FIG. 5 is a flow diagram of the synchronization engine of the adaptive receiver algorithm of FIG. 2, according to some embodiments; and FIG. 6 is a flow diagram of the decoding engine of the adaptive receiver algorithm of FIG. 2, according to some embodiments.

Further, some wireless devices have multiple antennas at the transmitter and receiver, known as multiple-input-multiple-output (MIMO) systems. MIMO systems separate data for transmission into discrete cells and transmit the cells simultaneously over different antennas, but in the same frequency band, with the transmission channel, in essence, being treated as a matrix.

Typically, only limited orthogonal channels (typical 3 or 8) are available for transmitting between entities in the wireless network. Therefore, multiple cells that are simultaneously operated on the same channel cannot be separated far enough, and will interfere with one another. On the other hand, there may exist noise-limited environments, such as at a home office, where a single AP covers a large area, and signal strength on the edge is very weak, approaching the noise floor.

Figure 1:
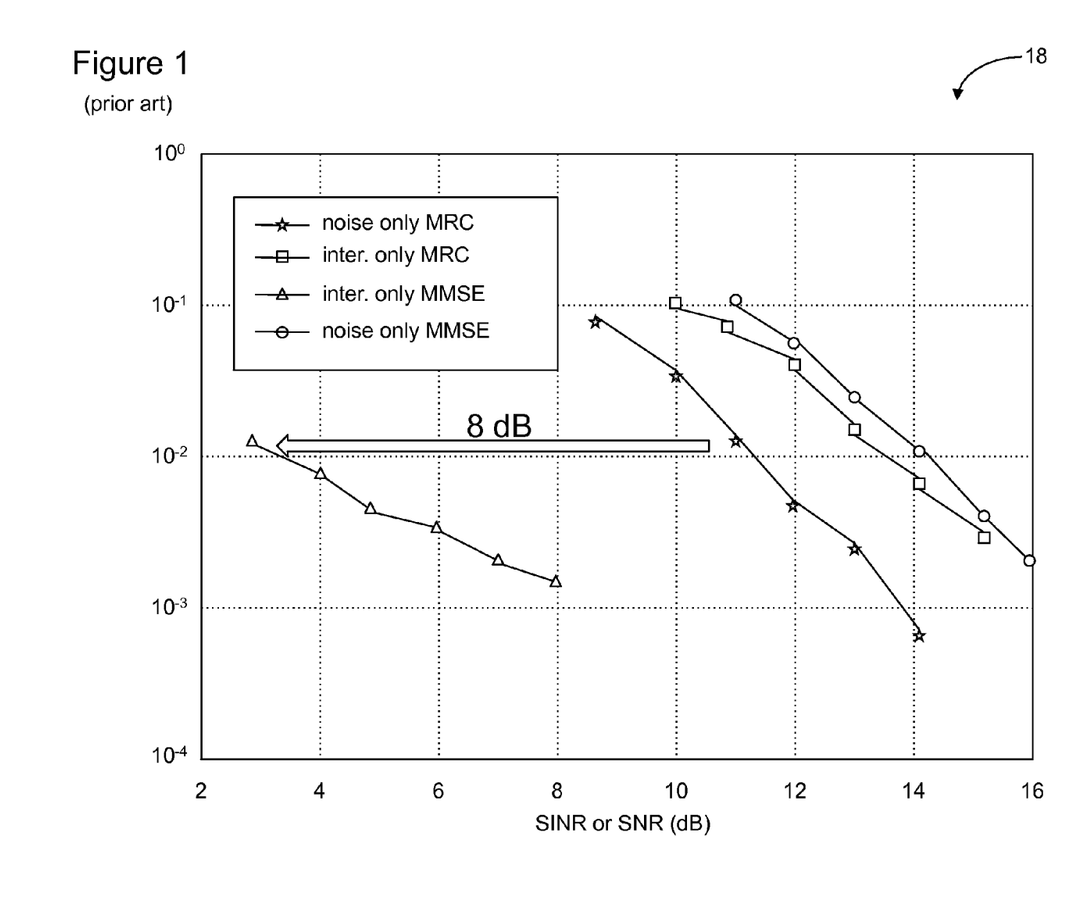
FIG. 1 is a performance comparison between MMSE and MRC in noise- and interference-limited channels, respectively, according to some embodiments.

A technique known as maximum ratio combining, or MRC, is optimal for noise-limited environments. MRC attempts to maximize the strength of the received signal. Another technique, minimum mean square error (MMSE) filtering, is designed to minimize the received errors. MMSE results in a performance gain if the environment is interference-limited (as shown in FIG. 1). This performance gain is due to the capability of MMSE to suppress a dominant interfering source. However, MMSE consumes more power than MRC.

Thus, there is a need for a receiver that can dynamically switch between MRC and MMSE techniques, depending on the operating environment of the wireless device.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

In accordance with the embodiments described herein, an adaptive receiver algorithm is disclosed, for use in MIMO-OFDM systems. The adaptive receiver algorithm selectively chooses either the MRC technique or the MMSE technique, for optimum receiver performance, depending on the characteristics of the wireless environment. The receiver thus operates in one of two operating modes, depending on the environment in which the radio executing the adaptive receiver algorithm resides.

FIG. 1 is a graph 18 showing a performance comparison between the MRC and MMSE techniques in a noise- and interference-limited channel, according to some embodiments. The graph 18 plots signal-to-interference ratio (SIR) or signal-to-noise ratio (SNR) versus packet error rate (PER), for a 1×2 single-input-multiple-output (SIMO), ½ low density parity coding (LDPC), with a code length of 1944, 16 quadrature amplitude modulation (QAM), IEEE Channel D, in a WLAN system. The plots are, from left to right, interference only, MMSE (triangles), noise only, MRC (stars), interference only, MRC (squares), and noise only, MMSE (circles). MMSE gives the best performance (lowest PER) in an interference only environment; MRC gives a better performance than MMSE in a noise only environment.

MRC, maximum ratio combining, is a technique to maximize the strength of the received signal. MMSE, minimum mean square error, more complicated than MRC, obtains a covariance measurement of a dominant interfering signal and then suppressing the interfering signal using its covariance matrix. Both techniques filter the incoming signal. MRC may be thought of as MMSE with an identity matrix. When the interference of an incoming signal diminishes, the MMSE filter degrades to a MRC filter automatically as the covariance matrix of the interference plus noise approaches the identity matrix.

Calculating the covariance matrix, however, is highly complex, involving substantial central processing unit (CPU) and/or digital signal processing (DSP) resources, for example. The MMSE filter thus consumes a great deal more power than the MRC filter.

From the graph 18 of FIG. 1, it may be inferred that MMSE is preferred in interference-limited environments while MRC is preferred in noise-limited environments. FIG. 2 is a block diagram of an adaptive receiver algorithm 100 that exploits this principle, according to some embodiments. The adaptive receiver algorithm 100, operating in a radio 50 of a wireless device, selectively optimizes the radio's receiver to be either an MRC receiver 40 or an MMSE receiver 60.

The radio 50 includes an antenna 70, for receiving the incoming signal. In some embodiments, the adaptive receiver algorithm 100 analyzes the signal environment, to determine whether the environment is noise-limited or interference-limited. When the signal environment is deemed noise-limited, the adaptive receiver algorithm 100 turns on the MRC receiver 40; when the signal environment is deemed interference-limited, the adaptive receiver algorithm 100 turns on the MMSE receiver 60.

The adaptive receiver algorithm 100 includes a synchronization engine 200 and a decoding engine 300. The synchronization engine 200 includes signal recognition 10, for analyzing the incoming signal, as well as for gathering covariance measurements. The decoding engine 300 includes a covariance measurement routine 20, which takes place when the signal environment is determined to be interference-limited.

Figure 4:
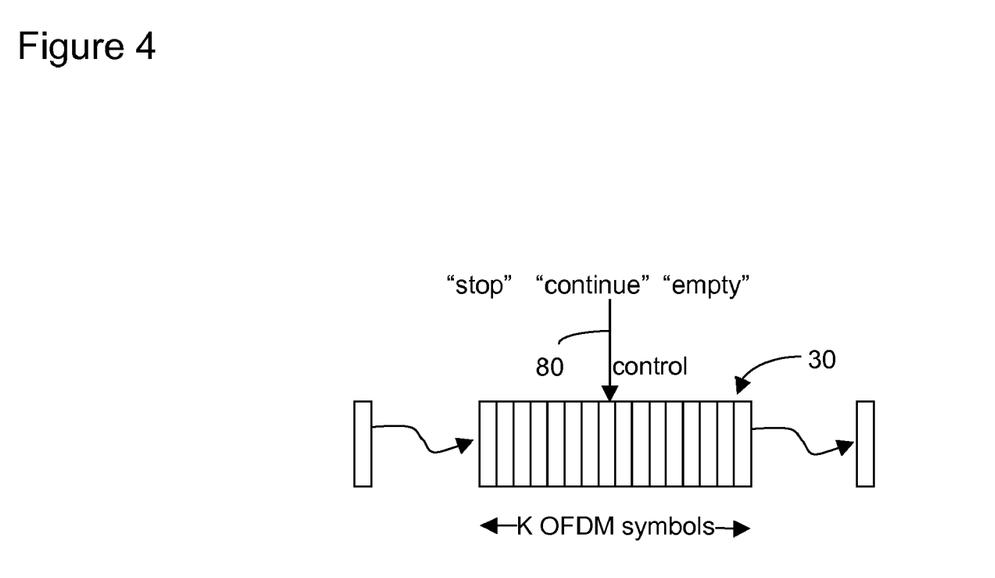
FIG. 4 is a diagram of the buffer of the adaptive receiver algorithm of FIG. 2, according to some embodiments.

The adaptive receiver algorithm 100 also makes use of a buffer 30, for storing the gathered covariance data. The buffer 30 may receive one or more commands 80 from either the synchronization engine 200 or from the decoding engine 300. When the covariance measurement routine 20 is executed, covariance data 90 is extracted from the buffer 30. FIGS. 4, 5, and 6 describe operations of the buffer 30, the synchronization engine 200, and the decoding engine 300, respectively. The components of the adaptive receiver algorithm 100 are merely representative of the functional features of the algorithm, and are not meant to be strictly interpreted as structural components. Designers of ordinary skill in the art recognize a number of implementation possibilities for the adaptive receiver algorithm 100.

Figure 3A:
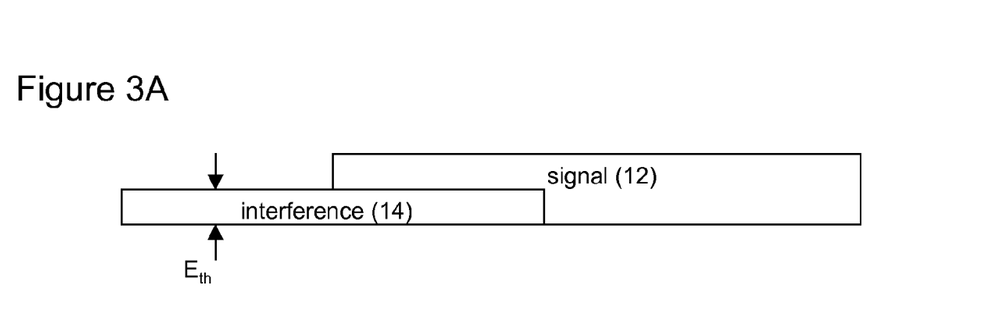
FIGS. 3A, 3B, and 3C are block diagrams illustrating three types of interference, according to some embodiments.
Figure 3B:
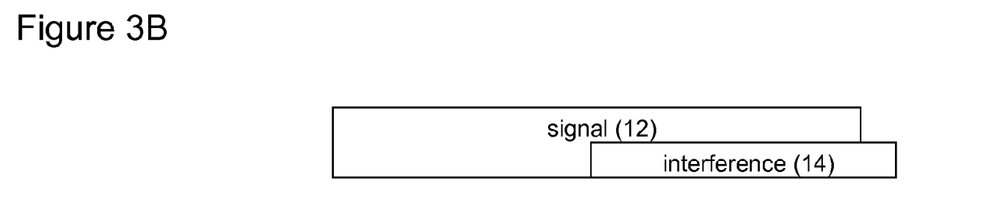
Figure 3C:
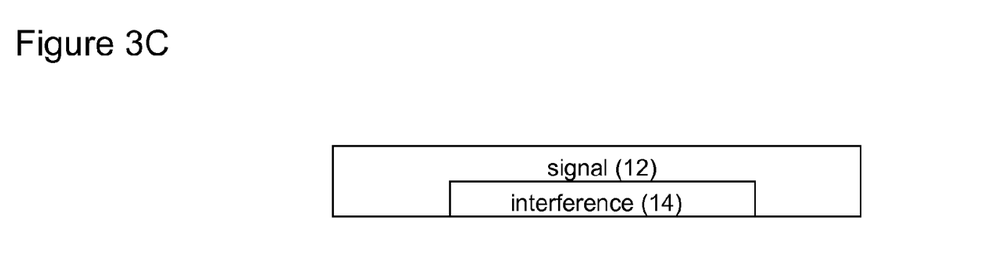

FIGS. 3A, 3B, and 3C show three possible interference scenarios that may occur in a WLAN environment. The interference scenarios are characterized as follows: type 1 interference, in FIG. 3A; type 2 interference, in FIG. 3B; type 3 interference in FIG. 3C. The type 1 interference (FIG. 3A) includes interference 14 preceding the signal 12, with the interference 14 being at an energy threshold, $E_{th}$. The type 2 interference (FIG. 3B) includes interference 14 occurring substantially after the signal 12 is detected. The type 3 interference (FIG. 3C) includes interference 14 occurring during a substantial part of the signal 12 transmission.

The type 1, type 2, and type 3 interference depictions do not include "noise". However, "noise" is assumed to be at a constant level below interference (say, −90 dBm). "Interference" specifically means co-channel interference sent out by a remotely located device. Therefore, interference may be considered a WLAN waveform.

In some embodiments, the adaptive receiver algorithm 100 deploys the MRC receiver 40 for type 2 interference (FIG. 3B) and for type 3 interference (FIG. 3C), but deploys the MMSE receiver 60 for type 1 interference (FIG. 3A). While it is true that the interference 14 in the type 2 interference may be detected and measured, the adaptive receiver algorithm 100 does not analyze for type 2 interference, since the interference 14 may be analyzed at the end of the packet, introducing extra delay for the receiving process.

As shown in FIG. 2, the adaptive receiver algorithm 100 performs signal recognition 10, in the synchronization engine 200. Signal recognition is the first step for any kind of receiver, and is also known as packet detection. There are two common methods for detecting the presence of a signal: energy-based and synchronization-based. The energy-based signal recognition is based on the simple fact that, whenever a packet is received, the signal energy increases. The difficulty with energy-based signal recognition is selecting an appropriate threshold. Synchronization-based signal recognition exploits what is known about the incoming signal, such as one or more characteristics of the preamble. Energy-based signal recognition is simpler than, but not as accurate as synchronization-based recognition.

The adaptive receiver algorithm 100 also performs covariance measurement 20, in the decoding engine 300. If co-channel interference is detected, the covariance measurement module 20 measures its covariance matrix. The MMSE receiver 60 uses the covariance matrix to suppress the dominant interfering source. If the energy measured by the signal recognition module 10 exceeds a detection threshold, denoted as $E_{th}$, the covariance measurement routine 20 uses an averaging method to measure the covariance. In some embodiments, the detection threshold, $E_{th}$, is −80 dBm. Further, if the synchronization-based signal detection method is used to detect the signal, an averaging method is likewise used to measure the covariance.

In some embodiments, the following averaging method is used to measure the covariance:

$$R = \frac{1}{K}\sum_{i=0}^{K-1} X_i \cdot X_i^H \quad (1)$$

where X is the received energy of the signal (for a given tone), and K indicates the number of OFDM symbols for the measurement. One OFDM symbol duration is 4 us in a WLAN system. Usually, K=4 should be enough for a typical WLAN system.

In some embodiments, the adaptive receiver algorithm 100 uses the buffer 30 to store the data samples for K OFDM symbols, but does not perform the actual covariance measurement until it has been determined whether the environment is interference-limited or noise-limited. This avoids a costly computation step that may be unnecessary.

In some embodiments, the covariance measurement routine 20 of the adaptive receiver algorithm 100 employs a covariance measurement, as disclosed in U.S. patent application Ser. No. 11/350,621, entitled, "MULTICARRIER RECEIVER AND METHODS OF GENERATING SPATIAL CORRELATION ESTIMATES FOR SIGNALS RECEIVED WITH A PLURALITY OF ANTENNAS", filed on Feb. 9, 2006. In this application, spatial correlation estimates are enhanced by multiplying by weighting values generated from a channel length estimate. The channel length estimate is calculated from a channel estimate (e.g., an estimate of the channel response function) and a signal-to-noise ratio estimate.

In some embodiments, the MRC receiver 40 is the default receiver for the adaptive receiver algorithm 100. The synchronization engine starts receiving a signal from the antenna 70. Whenever there is a stronger signal that allows the synchronization engine 200 to synchronize with the signal, the default receiving process is preempted, and a new receiving process commences, as depicted in the flow diagrams of FIGS. 5 and 6. For the new receiving process, the MMSE receiver 60 is used, with the covariance measurement 20 taking place in the decoding engine 300, using whatever samples have been collected in the buffer 30.

The buffer 30 of the adaptive receiver algorithm 100 is used to store data samples received from the antenna 70, so that the covariance measurement may be successfully obtained. The data samples are pre-fast-Fourier transform (pre-FFT) signals, and are stored in the buffer 30. In some embodiments, the buffer 30 is sized so that K OFDM symbols are stored. The buffer 30 is a first-in-first-out (FIFO) memory, such that, when the buffer 30 is full, as new timing samples are received, the oldest timing samples, the first ones in the buffer queue, will be discarded.

In some embodiments, the buffer 30 is controlled by a control signal 80, which may come from either the synchronization engine 200 or the decoding engine 300. The control signal 80 may specify either "continue", such that the buffer 30 continues to store samples, "stop", where the buffer 30 is to stop storing samples, and "empty", where the buffer 30 is to be emptied. The control signal 80 may, for example, be a switch controlled by one of the engines 200 or 300. The buffer 30 and controls 80 are depicted in FIG. 4, according to some embodiments. Since the covariance measurement is to be synchronized with the intended signal, the adaptive receiver algorithm 100 stops the buffering whenever the synchronization to the incoming packet is detected. Thus, data samples immediately preceding the incoming packet are used to estimate the covariance matrix of the interfering signal.

The synchronization engine 200 and the decoding engine 300 are described more particularly in the flow diagrams of FIGS. 5 and 6, respectively, according to some embodiments. These engines perform some handshaking with one another, as is also indicated with the connecting arrows in FIG. 2. Recall that the signal recognition module 10 of the synchronization engine 200 is connected to the antenna 70, for detecting the incoming packet. In FIG. 5, the synchronization engine 200 begins with an inquiry as to whether synchronization to a packet has occurred (block 202). If so, control passes immediately to the decoding engine 300 (FIG. 6). Otherwise, a second inquiry is made, whether the energy level of the antenna 70 has exceeded a threshold energy, given by $E_{th}$ (block 204). If so, the data samples continue to be stored in the buffer 30 for subsequent covariance measurement, using the $R_1$ equation, above (block 206). However, the covariance measurement is not yet being taken. A flag is set to one (block 208), and the synchronization engine 200 begins again.

The flag is used between the synchronization engine 200 and the decoding engine 300 to indicate whether the energy level has exceeded the threshold energy, $E_{th}$, which is measured in the synchronization engine 200. Although data sample gathering for covariance measurement takes place in both engines, the covariance matrix calculation does not take place until the decoding engine 300, at which time the threshold energy information is needed. The flag thus operates as a handshaking mechanism between the two engines.

If, on the other hand, the energy level of the antenna 70 has not exceeded the threshold energy, $E_{th}$, the synchronization engine 200 stops storing the data samples in the buffer 30 and empties the buffer 30 (block 212), using the "stop" control 80.

The flag is cleared (block 210), and the synchronization engine 200 begins again. The synchronization engine 200 runs continuously in this manner. Although data is being gathered for the covariance measurement 20, the power- and computing-intensive operations of calculating the covariance matrix are not performed in the synchronization engine 200.

Once the synchronization engine 200 has synchronized to a packet (the "yes" prong of block 202), the decoding engine 300 is executed, as illustrated in the flow diagram of FIG. 6. The decoding engine 300 commences by issuing a command 80 to the buffer 30 to "stop" storing data samples (block 302). Next, an inquiry is made whether the flag has been set (block 304). If so (the "yes" prong of block 304), the signal is deemed interference-limited, as having exceeded the threshold energy, $E_{th}$ (block 204 of FIG. 5), and the MMSE receiver 60 is enabled. Otherwise (the "no" prong of block 304), the signal is deemed not interference-limited, and the MRC receiver 40 is enabled.

Where the MMSE receiver 60 is enabled, the covariance matrix is calculated, using all the data samples that were stored in the buffer 30, and which immediately preceded the interfering signal (block 306). The formula for R given by (1), above may be used, or some other method may be used. The buffer 30 is also emptied at this time. Then, a "continue" command 80 is issued to the buffer 30 by the decoding engine 300 to again store data samples, in case a new covariance measurement is needed (block 308). Once the covariance matrix is calculated, the MMSE receiver is executed (block 310) to suppress the dominant interfering source, for optimum performance of the radio 50.

Where the MRC receiver 40 is enabled, the decoding engine 300 nevertheless continues to store data samples in the buffer 30 prospectively, in case covariance measurement is subsequently needed (block 312). The flag is set (block 314), and the receiver operations take place under MRC, without need to calculate the covariance matrix (block 315), using maximum ratio combining to increase the strength of the received signal. Following the receive operations, whether under MRC (block 315) or MMSE (block 310), the decoding engine 300 goes back to the synchronization engine 200, for continuous processing in the radio 50.

In some embodiments, the adaptive receiver algorithm 100 enables a low-cost, high-performance, interference-aware receiver for MIMO OFDM radios. This technique may improve the throughput of the WLAN product. The adaptive receiver algorithm 100 dramatically reduces the interference and improves network capacity in high-density WLAN products, in some embodiments. The adaptive receiver algorithm 100 may be used to differentiate the radio 50 from competing products.

While the application has been described with respect to a limited number of embodiments, those skilled in the art will appreciate numerous modifications and variations therefrom. It is intended that the appended claims cover all such modifications and variations as fall within the true spirit and scope of the invention.

We claim:

1. An adaptive receiver, comprising:
   a buffer to store data samples from an incoming signal stream, wherein the signal stream is modulated using orthogonal frequency division multiplexing (OFDM), the buffer to store a number of OFDM data samples;
   a synchronization engine to perform signal recognition and characterization of the incoming signal stream, the characterization being according to a type of interference being received along with the incoming signal stream, the interference comprising co-channel interference caused by a device that is located remote to the adaptive receiver, the interference being at or above a threshold energy level, the characterization being either of a first type, a second type, or a third type, wherein:
  a signal stream of the first type comprises interference preceding the signal stream;
  a signal stream of the second type comprises interference occurring substantially after the signal stream is detected; and
  a signal stream of the third type comprises interference occurring substantially during the transmission of the signal stream; and
a decoding engine to calculate a covariance matrix only after the signal stream is characterized as being the first type;
wherein the adaptive receiver is operated as a maximum ratio combining receiver when the signal stream is of the second or third type or, alternatively, as a minimum mean square error receiver when the signal stream is of the first type.

2. The adaptive receiver of claim 1, wherein the synchronization engine further:
  determines that an energy level of the incoming signal stream exceeds the threshold energy level; and
  continues to store the data samples in the buffer.

3. The adaptive receiver of claim 2, wherein the synchronization engine further:
  sets a flag, wherein the flag set indicates to the decoding engine that the interference coupled with the incoming signal stream exceeds the threshold energy level; and
  passes control to the decoding engine when the incoming signal stream is synchronized.

4. The adaptive receiver of claim 3, wherein the decoding engine further:
  stops collecting data samples into the buffer;
  determines that the flag is set;
  calculates the covariance matrix using the stored data samples in the buffer;
  empties the buffer of data samples; and
  reinitiates collection of data samples into the buffer for a subsequent covariance calculation when needed; and
  sends the buffered data samples to the minimum mean square error receiver.

5. The adaptive receiver of claim 4, wherein the synchronization engine further:
  determines that an energy level of the incoming signal stream does not exceed the threshold energy level; and
  stops storing data samples in the buffer.

6. The adaptive receiver of claim 5, wherein the synchronization engine further:
  clears the flag, wherein the flag cleared indicates to the decoding engine that the interference coupled with the incoming signal stream does not exceed the threshold energy level; and
  passes control to the decoding engine when the incoming signal stream is synchronized.

7. The adaptive receiver of claim 6, wherein the decoding engine further:
  stops collecting data samples into the buffer;
  determines that the flag is cleared; and
  reinitiates collection of data samples into the buffer for a subsequent covariance calculation when needed; and
  sends the buffered data samples to the maximum ratio combining receiver.

8. The adaptive receiver of claim 1, wherein the buffer is a first-in-first-out memory.

9. A method to selectively operate a radio in one of two operating modes, the method comprising:
  sampling symbols from an incoming data stream, the symbols being orthogonal frequency division multiplexing symbols of the stream, the symbols to be stored in a buffer of the radio;
  characterizing the incoming data stream as being either a type 1 data stream, a type 2 data stream, or a type 3 data stream, the characterization being based on co-channel interference being received with the incoming symbols, the interference being caused by a device that is located remote to the radio, wherein:
    a type 1 data stream comprises interference preceding the data stream, wherein the interference has an energy level exceeding a threshold energy level;
    a type 2 data stream comprises interference occurring substantially after the signal stream is detected; and
    a type 3 data stream comprises interference occurring substantially during the transmission of the signal stream;
  calculating a covariance matrix when the incoming data stream is characterized as a type 1 data stream, wherein the covariance matrix is not calculated when the incoming data stream is characterized as a type 2 or type 3 data stream; and
  running, using a receiver, either a minimum mean square error receiver or a maximum ratio combining receiver in the radio, wherein the minimum mean square error receiver is run only when the incoming data stream is characterized as a type 1 data stream.

10. The method of claim 9, further comprising:
  issuing a command to the buffer to stop storing the symbols when the incoming data stream is characterized as either a type 2 data stream or a type 3 data stream.

11. The method of claim 9, calculating the covariance matrix further comprising:
  retrieving the stored symbols from the buffer, the stored symbols being those stored immediately prior to the incoming data stream being characterized as a type 1 data stream; and
  calculating the covariance matrix using the stored symbols.

12. The method of claim 11, calculating the covariance matrix using the stored symbols further comprising:
  calculating the covariance matrix using the following formula:

$$R = \frac{1}{K} \sum_{i=0}^{K-1} X_i \cdot X_i^H;$$

where X is the energy level of the incoming data stream and K indicates a number of orthogonal frequency division multiplexing symbols.

13. The method of claim 11, calculating the covariance matrix further comprising:
  issuing a command to the buffer to continue storing the symbols;
  wherein the receiver is operated as the minimum mean square error receiver.

14. The method of claim 9, further comprising:
  issuing a second command to the buffer to continue storing the symbols even though the receiver is operated as the maximum ratio combining receiver.

\* \* \* \* \*